(12) United States Patent  
Miyake

(10) Patent No.: US 7,286,450 B2  
(45) Date of Patent: Oct. 23, 2007

(54) LIGHT PICKUP DEVICE WITH CENTER AXIS AND LIGHT BALANCING ADJUSTMENT

(75) Inventor: Koji Miyake, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 588 days.

(21) Appl. No.: 10/756,228

(22) Filed: Jan. 12, 2004

(65) Prior Publication Data

US 2004/0145979 A1 Jul. 29, 2004

(51) Int. Cl.
*G11B 7/095* (2006.01)

(52) U.S. Cl. .................. 369/44.32; 369/53.19

(58) Field of Classification Search ............ 369/44.32, 369/53.19, 44, 32; *G11B 7/905, 7/095*
See application file for complete search history.

(56) References Cited

U.S. PATENT DOCUMENTS

| | | | |
|---|---|---|---|
| 4,507,766 A * | 3/1985 | Saimi et al. ............. | 369/44.14 |
| 4,767,921 A * | 8/1988 | Kawasaki et al. ........ | 250/201.5 |
| 4,933,794 A * | 6/1990 | Gitto ...................... | 369/13.16 |
| 5,111,448 A * | 5/1992 | Komma et al. .......... | 369/44.23 |
| 5,172,356 A * | 12/1992 | Kibune ................... | 369/44.14 |
| 5,247,503 A * | 9/1993 | Nomiyama et al. ...... | 369/44.35 |
| 6,163,409 A * | 12/2000 | Uchiyama et al. ........ | 359/634 |
| 6,522,619 B2 * | 2/2003 | Yanagisawa et al. ...... | 369/121 |
| 6,633,530 B1 * | 10/2003 | Takeda ................... | 369/112.01 |
| 7,145,859 B2 * | 12/2006 | Park et al. .............. | 369/112.05 |

FOREIGN PATENT DOCUMENTS

| | | |
|---|---|---|
| JP | 63-050920 A | 3/1988 |
| JP | 63-140426 A | 6/1988 |
| JP | 63-167438 | 7/1988 |
| JP | 01-313988 A | 12/1989 |
| JP | 02-005113 U | 1/1990 |
| JP | 02-066733 A | 3/1990 |
| JP | 02-220228 | 9/1990 |
| JP | 06-167677 A | 6/1994 |
| JP | 07-334850 A | 12/1995 |
| JP | 09-167351 | 6/1997 |
| JP | 11-144303 A | 5/1999 |
| JP | 2001-252618 | * 9/2001 |
| JP | 2002-008262 | 1/2002 |

* cited by examiner

*Primary Examiner*—Aristotelis M Psitos
(74) *Attorney, Agent, or Firm*—Morrison & Foerster LLP

(57) ABSTRACT

A light pickup device includes a light projection optical system comprising a light source which emits light, and an objective lens which condenses the light on an optical disk, a light detection optical system comprising a light detector, and a condenser lens which condenses light reflected from the optical disk on the light detector, and an adjustment optical element for coinciding a center axis of an intensity distribution of the light condensed on the optical disk by the light projection optical system with an optical axis of the objective lens.

4 Claims, 13 Drawing Sheets

FIG.14(a)
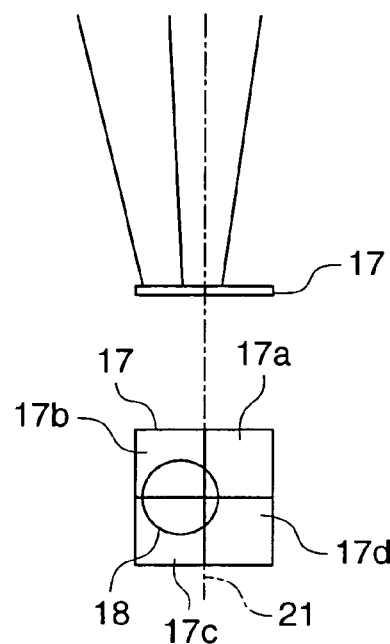
FIG.14(b)
FIG.15
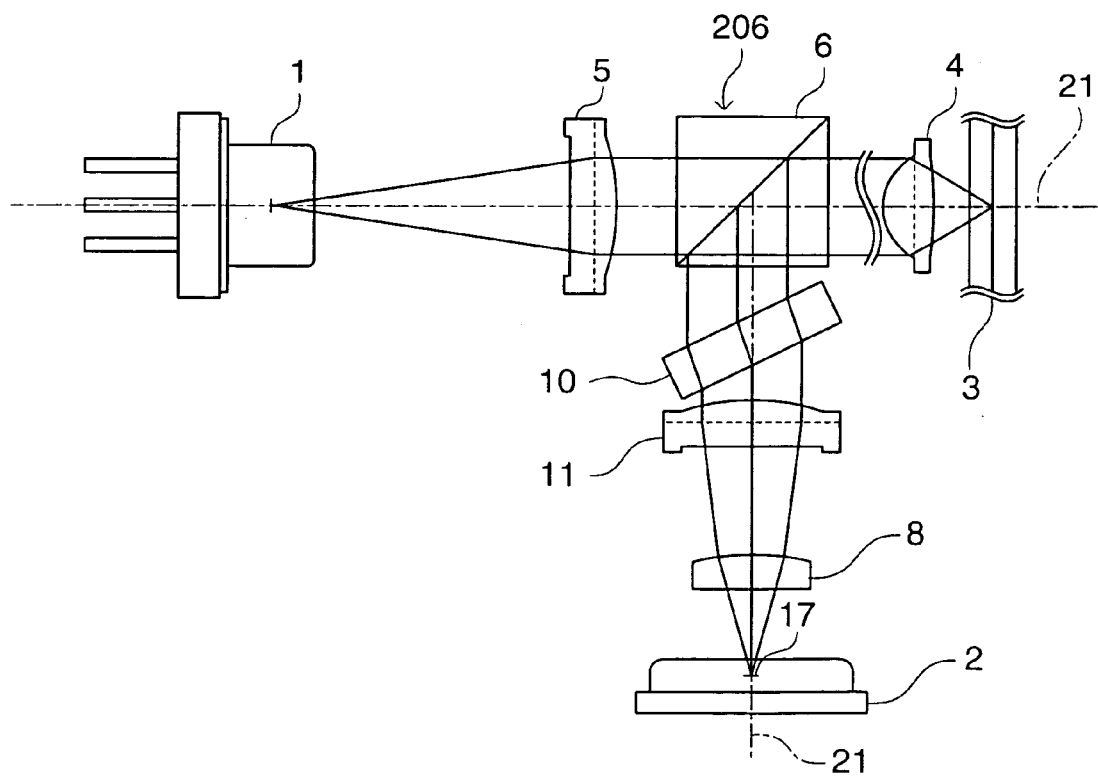

FIG.16(a)
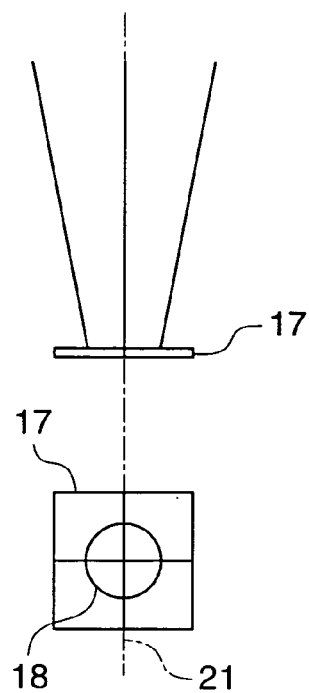
FIG.16(b)
FIG.17
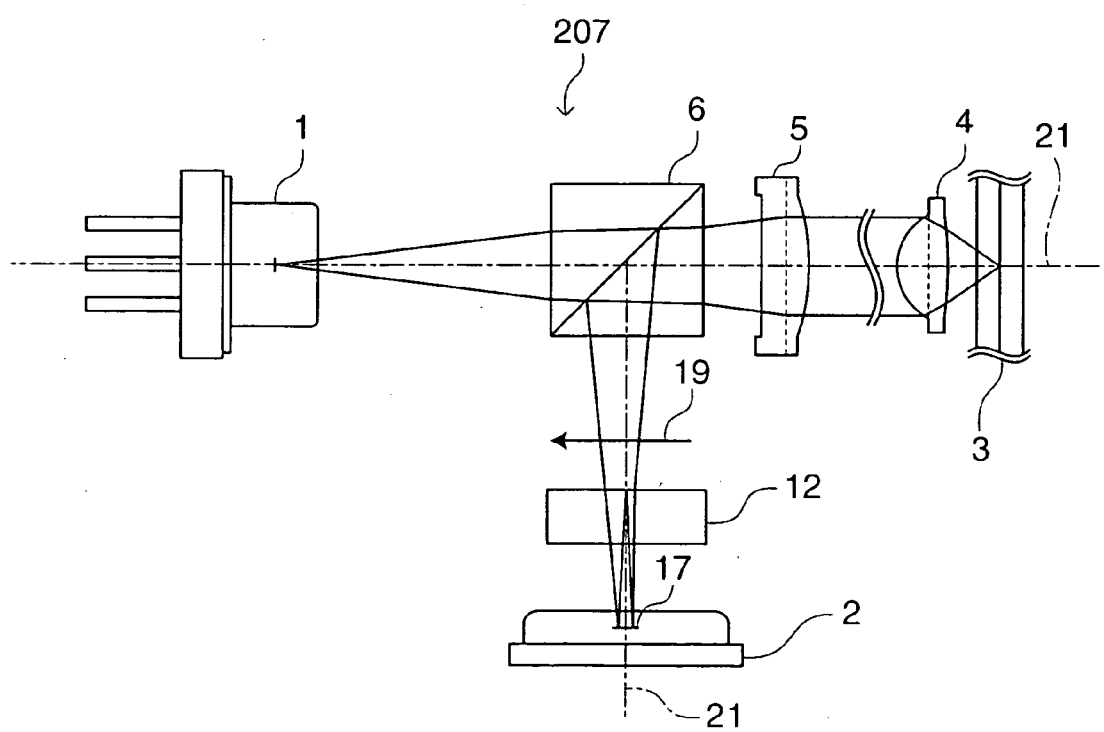

LIGHT PICKUP DEVICE WITH CENTER AXIS AND LIGHT BALANCING ADJUSTMENT

CROSS-REFERENCE TO RELATED APPLICATIONS

This application is related to Japanese patent application No. 2003-013774 filed on Jan. 22, 2003, whose priority is claimed under 35 USC § 119, the disclosure of which is incorporated by reference in its entirety.

BACKGROUND OF THE INVENTION

1. Field of the Invention

The present invention relates to a light pickup device and an optical disk apparatus. Particularly, the invention relates to a light pickup device and an optical disk apparatus for high density optical disks which require a high-quality light spot, and to a light pickup device and an optical disk apparatus which employ a light detector including a plurality of light receiving members for servo control.

2. Description of the Related Art

Japanese Unexamined Patent Publication No. Sho 63-167438 (1988), for example, discloses a prior-art optical disk apparatus related to the present invention, which comprises: an optical disk as an information recording medium; a semiconductor laser as a light source; a collimator lens which collimates light emitted from the semiconductor laser into a parallel light beam; a mirror which reflects the parallel light beam; beam shaping means which receives the light beam reflected from the mirror and shapes the light beam in a generally round cross section; an objective lens which receives the light beam shaped by the beam shaping means and forms a light spot on the optical disk; focusing error detection means which receives light reflected from the optical disk and detects a signal; tracking error detection means; information detection means; and an optical block which fixedly holds all the components; wherein the mirror is capable of performing at least one of operations for changing the angle of the axis of the light beam reflected from the mirror with respect to the optical axis of the mirror about a reflection point and for moving the axis of the reflected light in parallel without changing the angle of the reflected light axis so as to coincide the axis of the light beam incident on the objective lens with the optical axis of the objective lens. An optical disk apparatus including a light pickup device having a construction as shown in FIG. 23 is also known.

In the apparatus shown in FIG. 23, light emitted from a light source 101 passes through a half mirror 106 (beam splitter) and a collimator lens 105, and is condensed on an optical disk 103 by an objective lens 104. Then, the light reflected from the optical disk 103 passes through the objective lens 104, the collimator lens 105, the half mirror 106 and a cylindrical convex lens 108, and is finally condensed into a light spot on a light detector 102.

A semiconductor laser is typically employed as the light source 101. In general, the center axis of a light intensity distribution of the light emitted from the semiconductor laser is offset from the optical axis of the semiconductor laser by 2 to 3 degrees. Where such a semiconductor laser is mounted on the light pickup device, the center axis of the light intensity distribution of the emitted light is offset from the optical axis 121 by 2 to 3 degrees. This results in deformation of the light spot on the optical disk and variations in light transmission efficiency. However, these drawbacks present no serious problem in practical applications of the light pickup device and the optical disk apparatus for conventional low density optical disks such as CDs.

A light detector comprising a plurality of light receiving members is generally employed for detection of information signals and servo signals from the optical disk. In this case, the amounts of light incident on the respective light receiving members of the light detector are liable to be unbalanced due to the offset of the light intensity center of the semiconductor laser and displacement of the optical components. The unbalanced light amounts disturb the servo signals, but present no serious problem in practical applications of the light pickup device and the optical disk apparatus for the low density optical disks (e.g., CDs).

In the case of high density optical disks such as DVDs, however, proper detection of the information signals is made difficult by the deformation of the light spot on the optical disk due to the offset of the center axis of the light intensity distribution of the semiconductor laser, the variations in the light transmission efficiency, and the disturbance of the servo signals due to the unbalanced light amounts on the respective light receiving members of the light detector.

SUMMARY OF THE INVENTION

In view of the foregoing, the present invention is directed to a light pickup device and an optical disk apparatus which can properly detect information signals even if the center axis of a light intensity distribution of a semiconductor laser is offset.

According to the present invention, there is provided a light pickup device, which comprises: a light projection optical system comprising a light source which emits light, and an objective lens which condenses the light on an optical disk; a light detection optical system comprising a light detector, and a condenser lens which condenses light reflected from the optical disk on the light detector; and an adjustment optical element for coinciding a center axis of an intensity distribution of the light condensed on the optical disk by the light projection optical system with an optical axis of the objective lens. With this arrangement, the provision of the adjustment optical element makes it possible to correct an offset of the center axis of the light intensity distribution of the light source, so that the light pickup device can properly detect information signals.

BRIEF DESCRIPTION OF THE DRAWINGS

FIGS. 14(a) and 14(b) are an enlarged side view and a plan view, respectively, illustrating the surroundings of a light detector shown in FIG. 13;

FIG. 15 is a diagram illustrating the optical disk apparatus of the sixth embodiment after adjustment;

FIGS. 16(a) and 16(b) are an enlarged side view and a plan view, respectively, illustrating the surroundings of the light detector shown in FIG. 15;

FIG. 17 is a diagram illustrating the construction of an optical disk apparatus according to a seventh embodiment of the present invention;

DETAILED DESCRIPTION OF THE INVENTION

Figure 1:
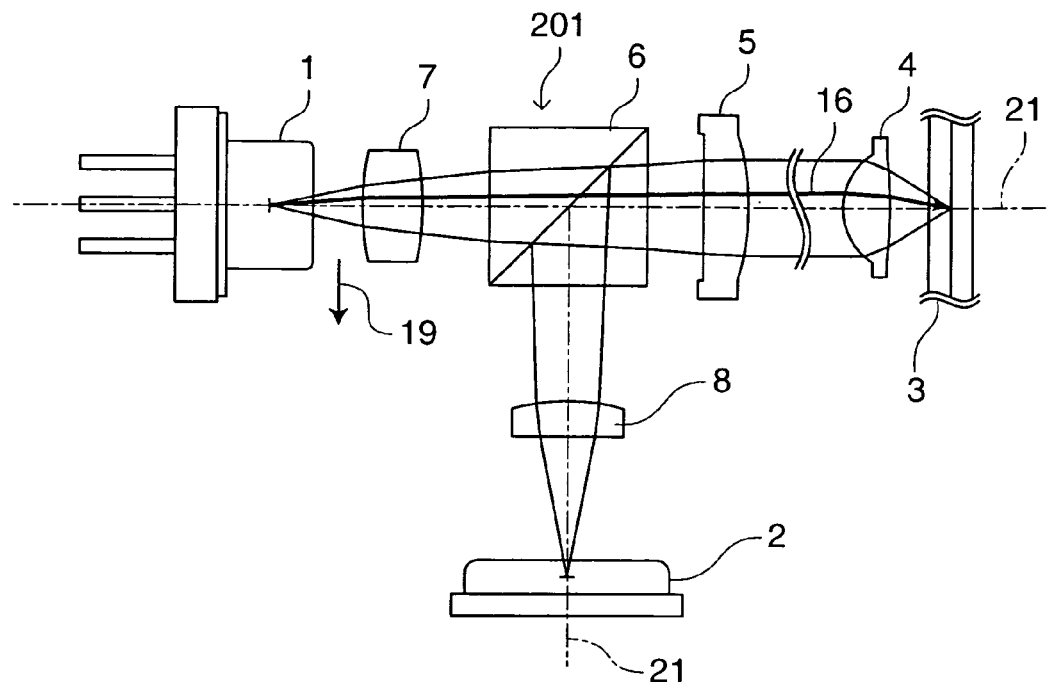
FIG. 1 is a diagram illustrating the construction of an optical disk apparatus according to a first embodiment of the present invention.

According to one aspect of the present invention, there is provided a light pickup device, which comprises: a light projection optical system comprising a light source which emits light, and an objective lens which condenses the light on an optical disk; a light detection optical system comprising a light detector, and a condenser lens which condenses light reflected from the optical disk on the light detector; and an adjustment optical element for coinciding a center axis of an intensity distribution of the light condensed on the optical disk by the light projection optical system with an optical axis of the objective lens.

In the present invention, the adjustment optical element may comprise a lens. Alternatively, the adjustment optical element may comprise a light reflective member, or a planar light transmissive element.

The light source and the light detector may be unified.

According to another aspect of the present invention, there is provided a light pickup device, which comprises: a light projection optical system having a light source for emitting light, and adapted to condense the light on an optical disk; a light detection optical system having a light detector comprising a plurality of light receiving members, and adapted to condense light reflected from the optical disk on the light detector; and a balancing adjustment optical element for balancing amounts of light incident on the respective light receiving members of the light detector.

In this case, the balancing adjustment optical element may comprise a lens, a light reflective member or a planar light transmissive element. Alternatively, the balancing adjustment optical element may comprise a hologram element.

The light source and the light detector may be unified. The hologram element may be fixed to the light detector.

The light source and the light detector may be unified into a unit, and the hologram element may be fixed to the unit of the light source and the light detector.

According to further another aspect of the present invention, there is provided an optical disk apparatus which comprises either of the light pickup devices described above.

According to still another aspect of the present invention, there is provided a light pickup device, which comprises: a light source; an objective lens; a first optical element for guiding light from the light source to the objective lens; a light detector comprising a plurality of light receiving members; a second optical element which, when light from the first optical element is condensed on an optical disk by the objective lens, condenses light reflected from the optical disk on the light detector; a light axis adjustment optical element for coinciding a center axis of an intensity distribution of the light condensed on the optical disk with an optical axis of the objective lens for light axis adjustment; and a balancing adjustment optical element for balancing amounts of light incident on the respective light receiving members of the light detector for balancing adjustment.

According to further another aspect of the present invention, there is provided a light pickup device, which comprises: a light source; an objective lens; a first optical element for guiding light from the light source to the objective lens; a light detector; a second optical element which, when light from the first optical element is condensed on an optical disk by the objective lens, condenses light reflected from the optical disk on the light detector; an adjustment optical element for coinciding a center axis of an intensity distribution of the light condensed on the optical disk with an optical axis of the objective lens for light axis adjustment; and a housing which firmly holds the light source and the first and second optical elements and movably supports the adjustment optical element; wherein the housing has a hole into which an adhesive is injected for fixing the adjustment optical element to the housing after the light axis adjustment.

According to still another aspect of the present invention, there is provided a light pickup device, which comprises: a light source; a first optical element for guiding light from the light source to an objective lens; a light detector comprising a plurality of light receiving members; a second optical element which, when light from the first optical element is condensed on an optical disk by the objective lens, condenses light reflected from the optical disk on the light detector; a balancing adjustment optical element for balancing amounts of light incident on the respective light receiving members of the light detector for balancing adjustment; and a housing which firmly holds the light source and the first and second optical elements and movably supports the balancing adjustment optical element; wherein the housing has a hole into which an adhesive is injected for fixing the balancing adjustment optical element to the housing after the balancing adjustment.

According to further another aspect of the present invention, there is provided a light pickup device, which comprises: a light source; an objective lens; a first optical element for guiding light from the light source to the objective lens; a light detector comprising a plurality of light receiving members; a second optical element which, when light from the first optical element is condensed on an optical disk by the objective lens, condenses light reflected from the optical disk on the light detector; a light axis adjustment optical element for coinciding a center axis of an intensity distribution of the light condensed on the optical disk with an optical axis of the objective lens for light axis adjustment; a balancing adjustment optical element for balancing amounts of light incident on the respective light receiving members of the light detector for balancing adjustment; and a housing which firmly holds the light source and the first and second optical elements and movably supports the light axis adjustment optical element and the balancing adjustment optical element; wherein the housing has first and second holes into which an adhesive is injected for fixing the light axis adjustment optical element and the balancing adjustment optical element to the housing after the optical axis adjustment and the balancing adjustment.

Optical disk apparatuses and light pickup devices according to embodiments of the present invention will hereinafter be described in detail with reference to the attached drawings. It should be understood that the invention be not limited to these embodiments.

FIRST EMBODIMENT

Figure 2:
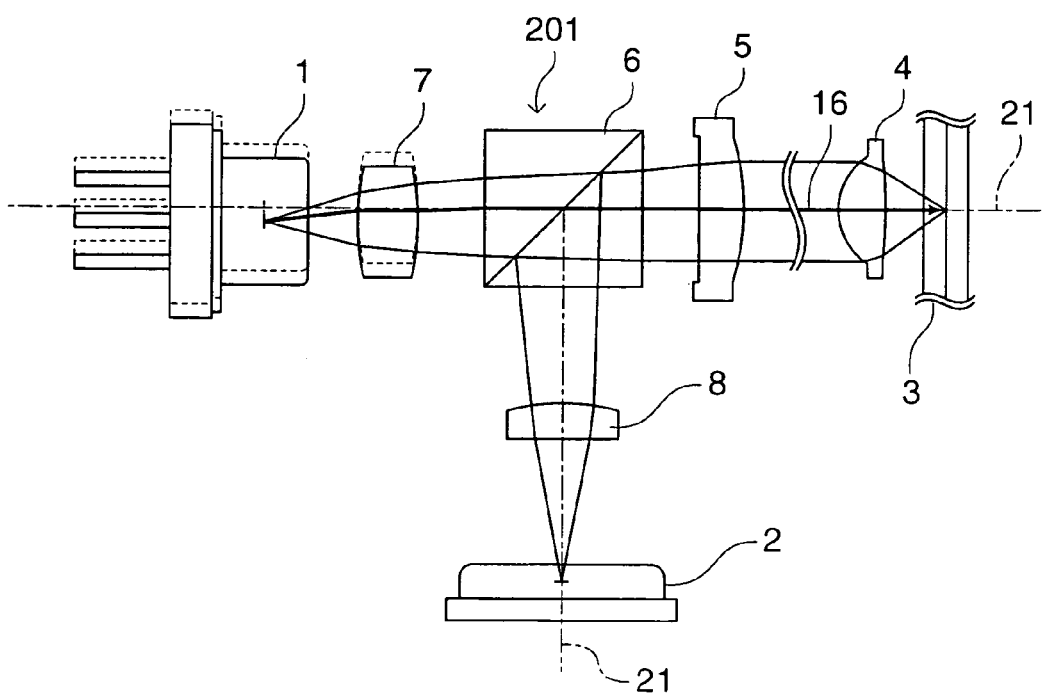
FIG. 2 is a diagram illustrating the optical disk apparatus of the first embodiment after adjustment.

FIGS. 1 and 2 are diagrams illustrating an optical disk apparatus including a light pickup device according to a first embodiment of the present invention. In these figures, there are shown the optical disk apparatus 201 including the light pickup device, a light source 1, a light detector 2, an optical disk 3, an objective lens 4, a collimator lens 5, a half mirror 6 (beam splitter) 6, an adjustment convex lens 7 for adjustment of the center axis of a light intensity distribution, a cylindrical convex lens 8, the center axis 16 of the light intensity distribution, and an optical axis 21. The adjustment convex lens 7 is disposed in a path of light projected from a light projection optical system, and is movable perpendicularly to the optical axis 21.

As shown in FIG. 1, light emitted from the light source 1 passes through the adjustment convex lens 7, the half mirror 6 and the collimator lens 5, and is condensed on the optical disk 3 by the objective lens 4. Then, light reflected from the optical disk 3 is condensed on the light detector 2 through the objective lens 4, the collimator lens 5, the half mirror 6 and the cylindrical convex lens 8.

Where the center axis 16 of the light intensity distribution of the light emitted from the light source 1 is offset from the center (optical axis 21) of the objective lens 4 as shown in FIG. 1, for example, a light spot on the optical disk is deformed, thereby preventing proper signal detection. In this embodiment, however, the adjustment convex lens 7 is moved in the direction of an arrow 19 (FIG. 1) from a position indicated by a broken line to a position indicated by a solid line (FIG. 2) for the adjustment. Thus, the center axis 16 of the light intensity distribution of the light emitted from the light source 1 is adjusted so as to pass through the center (optical axis 21) of the objective lens 4.

In order to allow the light emitted from the light source 1 to be incident perpendicularly on the objective lens 4, the light source 1, in addition to the adjustment convex lens 7, is moved from a position indicated by a broken line to a position indicated by a solid line as shown in FIG. 2 in this embodiment. The positional adjustment of the light source 1 is also carried out in the conventional light pickup device.

SECOND EMBODIMENT

Figure 3:
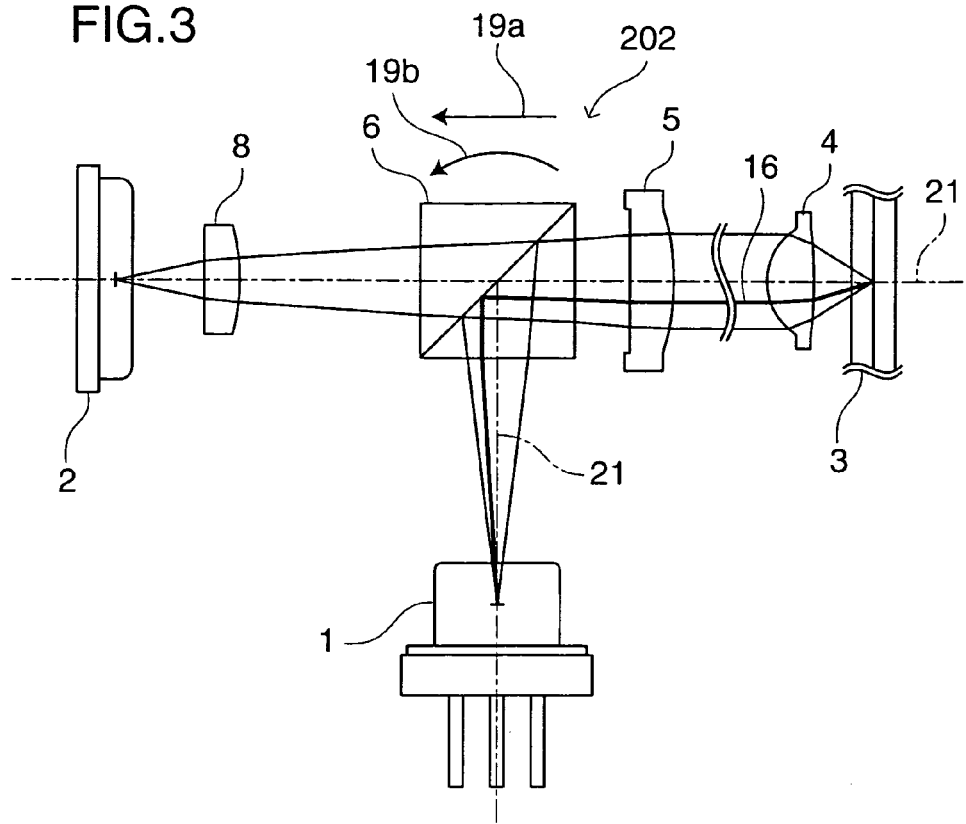
FIG. 3 is a diagram illustrating the construction of an optical disk apparatus according to a second embodiment of the present invention.
Figure 4:
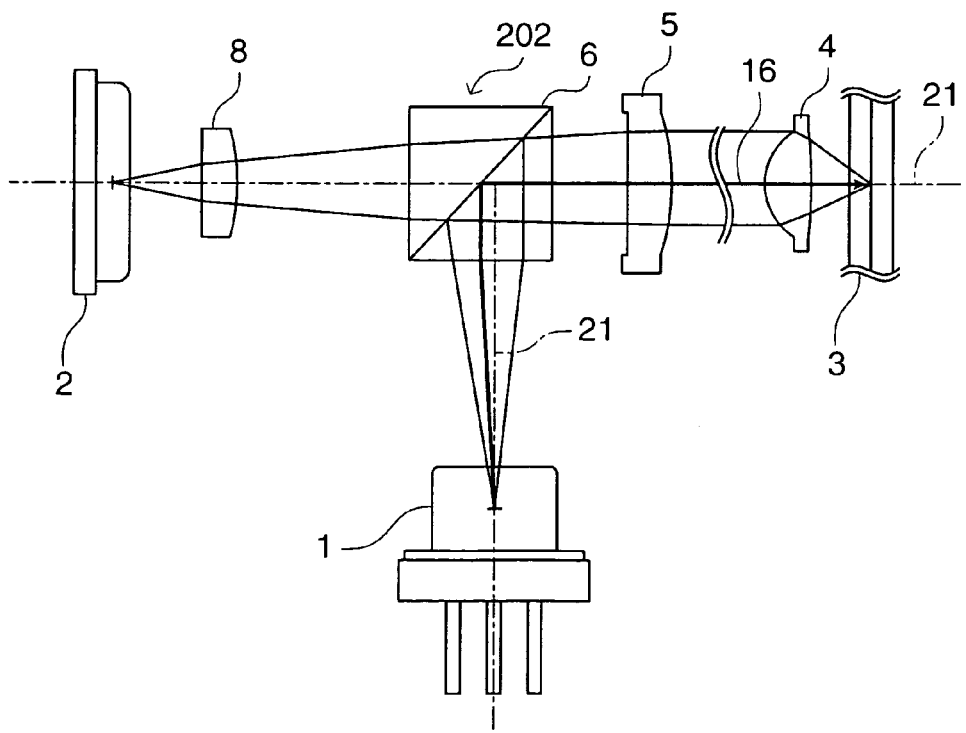
FIG. 4 is a diagram illustrating the optical disk apparatus of the second embodiment after adjustment.

FIGS. 3 and 4 are diagrams illustrating a second embodiment of the present invention. In these figures, there are shown an optical disk apparatus 202 including a light pickup device, a light source 1, a light detector 2, an optical disk 3, an objective lens 4, a collimator lens 5, a half mirror 6, a cylindrical convex lens 8, the center axis 16 of a light intensity distribution, and an optical axis 21.

Light emitted from the light source 1 is reflected on the half mirror 6, passes through the collimator lens 5, and is condensed on the optical disk 3 by the objective lens 4. Then, light reflected from the optical disk 3 is condensed on the light detector 2 through the objective lens 4, the collimator lens 5, the half mirror 6 and the cylindrical convex lens 8.

In this embodiment, the half mirror 6 (light reflective member) is employed as an optical element for adjustment of the center axis 16 of the light intensity distribution. The half mirror 6 is disposed in a path of light projected from a light projection optical system, and is movable in the directions of arrows 19a, 19b in FIG. 3 for positional and angular adjustment thereof. Where the center axis 16 of the light intensity distribution of the light emitted from the light source 1 is offset from the center of the objective lens 4 as shown in FIG. 3, the position and angle of the half mirror 6 are adjusted. Thus, the center axis 16 of the light intensity distribution is adjusted so as to pass through the center (optical axis) of the objective lens as shown in FIG. 4.

THIRD EMBODIMENT

Figure 5:
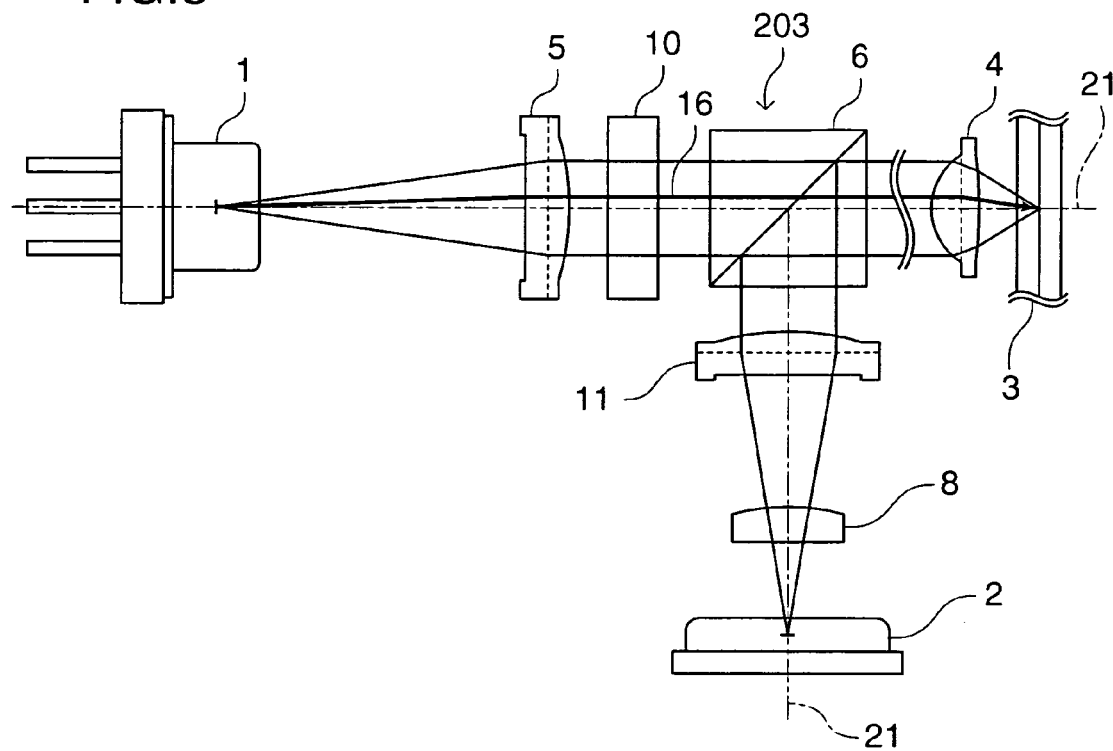
FIG. 5 is a diagram illustrating the construction of an optical disk apparatus according to a third embodiment of the present invention.
Figure 6:
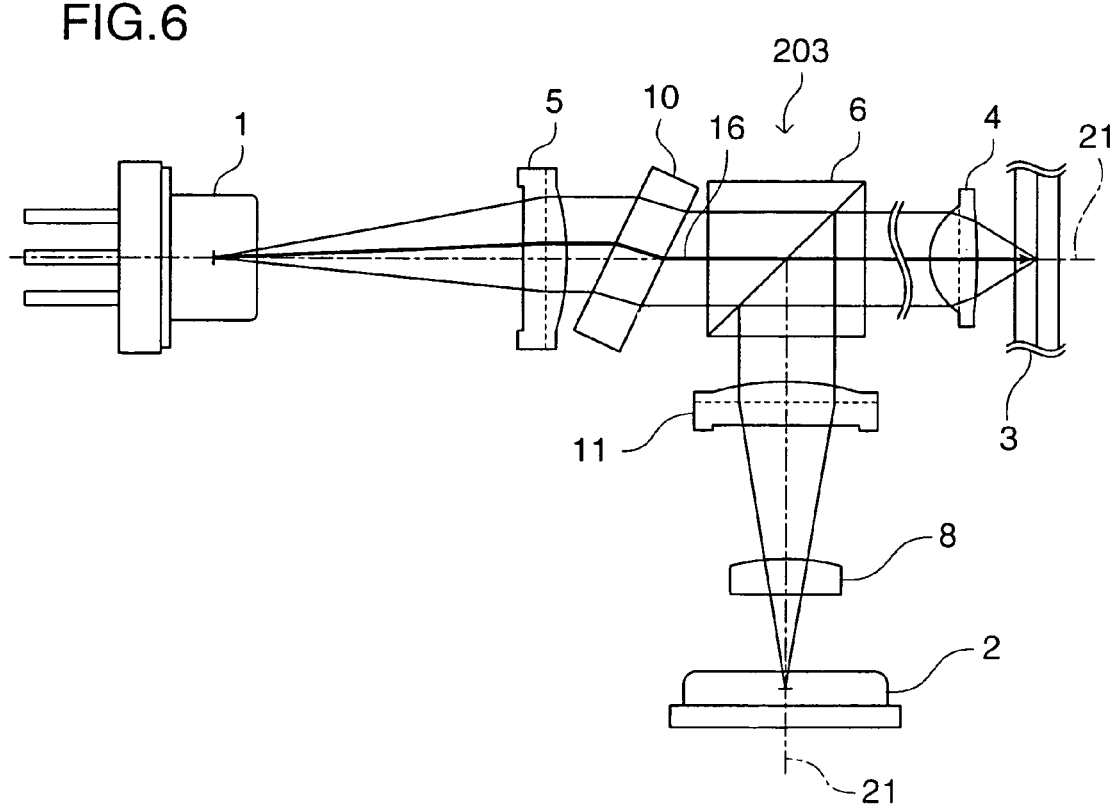
FIG. 6 is a diagram illustrating the optical disk apparatus of the third embodiment after adjustment.

FIGS. 5 and 6 are diagrams illustrating a third embodiment of the present invention. In these figures, there are shown an optical disk apparatus 203 including a light pickup device, a light source 1, a light detector 2, an optical disk 3, an objective lens 4, a collimator lens 5, a half mirror 6, a cylindrical convex lens 8, an adjustment transparent plate 10, a spot lens 11, the center axis 16 of a light intensity distribution, and an optical axis 21.

Light emitted from the light source 1 passes through the collimator lens 5, the adjustment transparent plate 10 and the half mirror 6, and is condensed on the optical disk 3 by the objective lens 4. Then, light reflected from the optical disk 3 is condensed on the light detector 2 through the objective lens 4, the half mirror 6, the spot lens 11, and the cylindrical convex lens 8.

In this embodiment, the adjustment transparent plate 10 is employed as an optical element for the adjustment of the center axis of the light intensity distribution. The adjustment transparent plate 10 is disposed in a path of parallel light projected from a light projection system, and adapted to be tilted with respect to the optical axis 21. Exemplary materials for the transparent plate 10 include glass and plastics, but are not limited thereto as long as they satisfy predetermined optical characteristics (e.g., the parallelism of front and back surfaces of the plate, the wavefront aberration and the light transmittance).

Where the center axis 16 of the light intensity distribution of the light emitted from the light source 1 is offset from the center of the objective lens 4 as shown in FIG. 5, the angle of the adjustment transparent plate 10 is adjusted as shown in FIG. 6. Thus, the center axis 16 of the light intensity distribution is adjusted so as to pass through the center of the objective lens.

FOURTH EMBODIMENT

Figure 7:
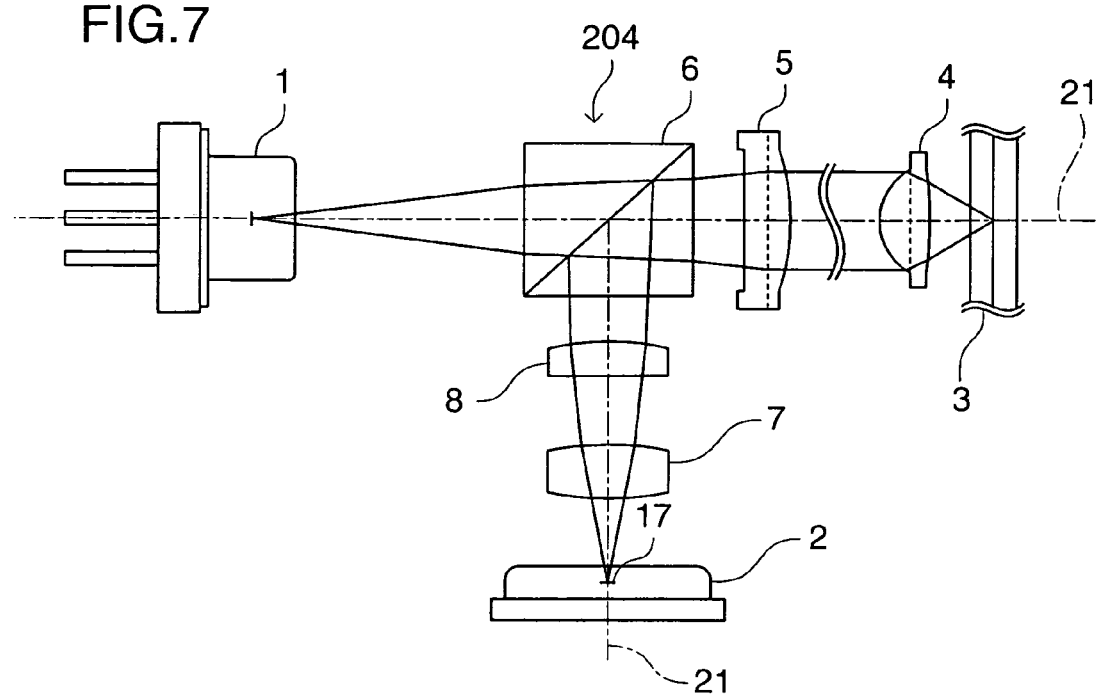
FIG. 7 is a diagram illustrating the construction of an optical disk apparatus according to a fourth embodiment of the present invention.

FIG. 7 is a diagram illustrating a fourth embodiment of the present invention. In this figure, there are shown an optical disk apparatus 204 including a light pickup device, a light source 1, a light detector 2, an optical disk 3, an objective lens 4, a collimator lens 5, a half mirror 6, a balancing adjustment convex lens 7, a cylindrical convex lens 8, and an optical axis 21. The light detector 2 includes a light receiving member 17 provided therein. The adjustment convex lens 7 is disposed in a path of light condensed by a light detection optical system, and is movable perpendicularly to the optical axis 21 for positional adjustment thereof.

Light emitted from the light source 1 passes through the half mirror 6 and the collimator lens 5, and is condensed on the optical disk 3 by the objective lens 4. Light reflected from the optical disk 3 passes through the objective lens 4 and the collimator lens 5, and is reflected on the half mirror 6. Then, the reflected light passes through the cylindrical convex lens 8 and the adjustment convex lens 7, and is projected on the light detector 2.

Figure 8A:
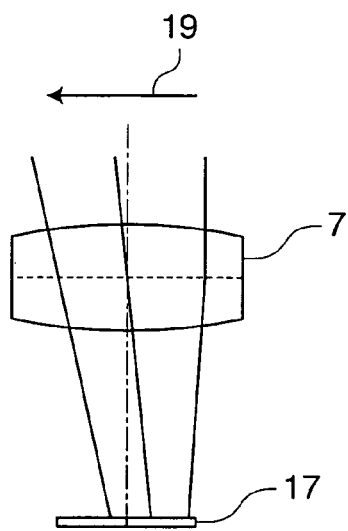
FIGS. 8(a) and 8(b) are an enlarged side view and a plan view, respectively, illustrating the surroundings of a light detector shown in FIG. 7.
Figure 8B:
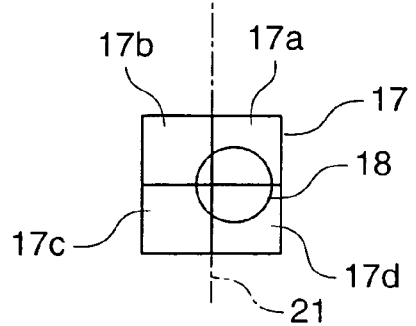
Figure 9A:
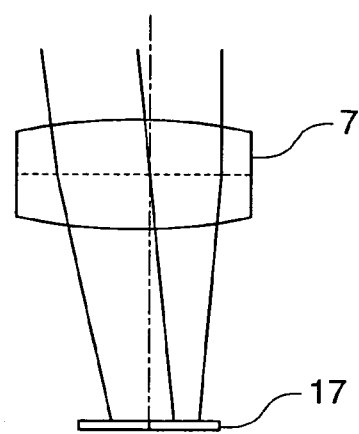
FIGS. 9(a) and 9(b) are an enlarged side view and a plan view, respectively, illustrating the surroundings of the light detector shown in FIG. 7 after adjustment.
Figure 9B:
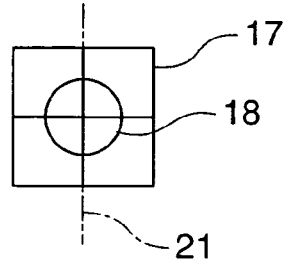

FIGS. 8(a) and 9(a) are enlarged diagrams of the adjustment convex lens 7 and the light receiving member 17 of the light detector 2. FIGS. 8(b) and 9(b) are plan views of the light receiving member 17 shown in FIGS. 8(a) and 9(a). The light receiving member 17 includes a plurality of light receiving members (four light receiving segments 17a to 17d). Where a light spot 18 is offset due to displacement of the optical components to unbalance the amounts of the light projected on the respective light receiving segments 17a to 17d in the light detector 2 as shown in FIG. 8(b), the adjustment convex lens 7 is moved in the direction of an arrow 19 (FIG. 8(a)) for the positional adjustment thereof. Thus, the unbalance of the amounts of the light projected on the respective light receiving members in the light detector 2 is corrected as shown in FIGS. 9(a) and 9(b).

FIFTH EMBODIMENT

Figure 10:
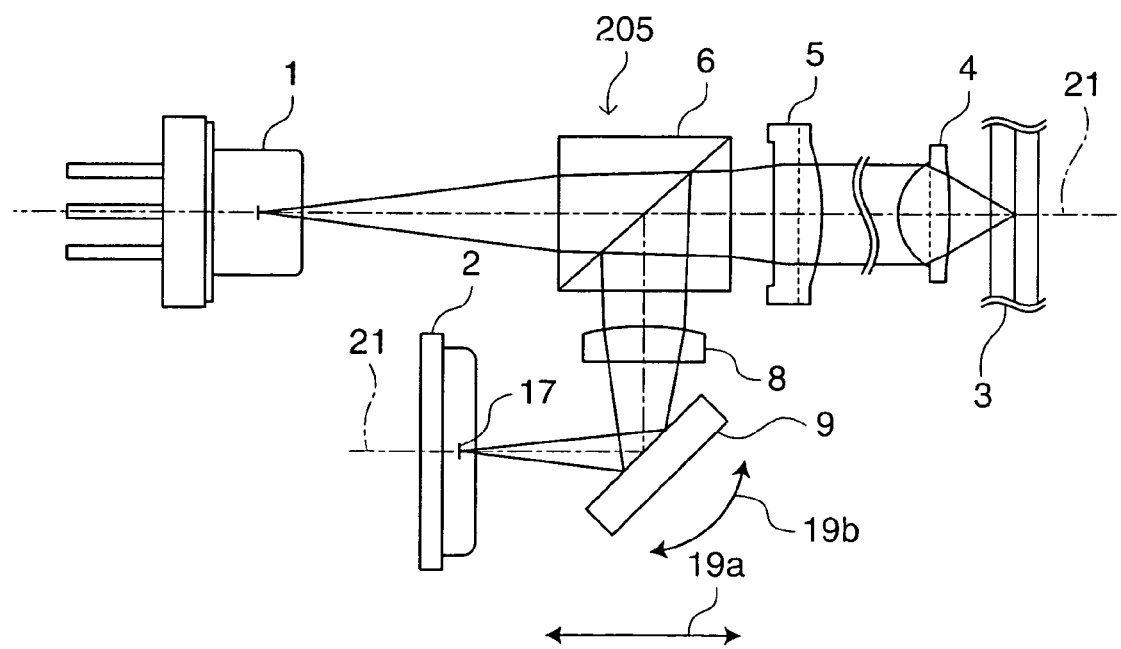
FIG. 10 is a diagram illustrating the construction of an optical disk apparatus according to a fifth embodiment of the present invention.

FIG. 10 illustrates a fifth embodiment of the present invention. In this figure, there are shown an optical disk apparatus 205 including a light pickup device, a light source 1, a light detector 2, an optical disk 3, an objective lens 4, a collimator lens 5, a half mirror 6, a cylindrical convex lens 8, a balancing adjustment reflective mirror 9, and an optical axis 21. The light detector 2 includes a light receiving member 17 provided therein. The reflective mirror 9 is disposed in a path of light condensed by a light detection optical system, and is movable in the directions of arrows 19a, 19b for positional and angular adjustment thereof.

Light emitted from the light source 1 passes through the half mirror 6 and the collimator lens 5, and is condensed on the optical disk 3 by the objective lens 4. Light reflected from the optical disk 3 passes through the objective lens 4 and the collimator lens 5, and is reflected on the half mirror 6. Then, the reflected light passes through the cylindrical convex lens 8, and is reflected on the reflective mirror 9 and projected on the light detector 2.

Figure 11A:
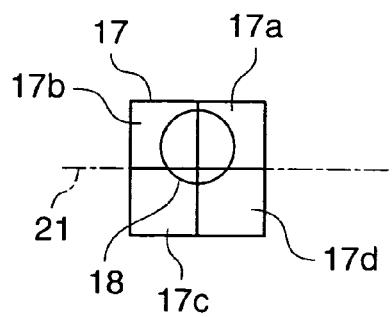
FIGS. 11(a) and 11(b) are an enlarged side view and a plan view, respectively, illustrating the surroundings of a light detector shown in FIG. 10.
Figure 11B:
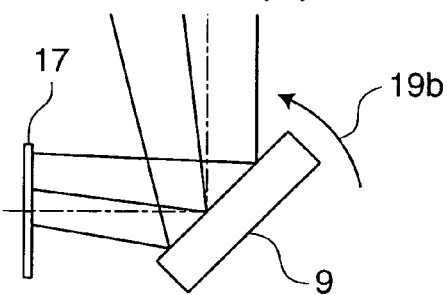
Figure 12A:
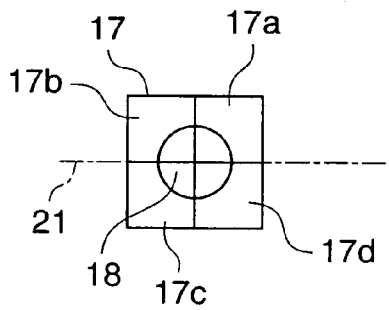
FIGS. 12(a) and 12(b) are an enlarged side view and a plan view, respectively, illustrating the surroundings of the light detector shown in FIG. 10 after adjustment.
Figure 12B:
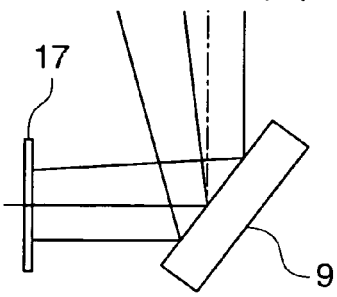

FIGS. 11(a) and 12(a) are enlarged diagrams of the adjustment reflective mirror 9 and the light receiving member 17 of the light detector 2. FIGS. 11(b) and 12(b) are plan views of the light receiving member 17 shown in FIGS. 11(a) and 12(a). The light receiving member 17 includes a plurality of light receiving members (four light receiving segments 17a to 17d). Where a light spot 18 is offset due to displacement of the optical components to unbalance the amounts of the light projected on the respective light receiving segments 17a to 17d in the light detector 2 as shown in FIG. 11(b), the adjustment mirror 9 is moved in the direction of an arrow 19b as shown in FIG. 11(a) for the angular adjustment. Thus, the unbalance of the amounts of the light projected on the respective light receiving members is corrected as shown in FIGS. 12(a) and 12(b).

SIXTH EMBODIMENT

Figure 13:
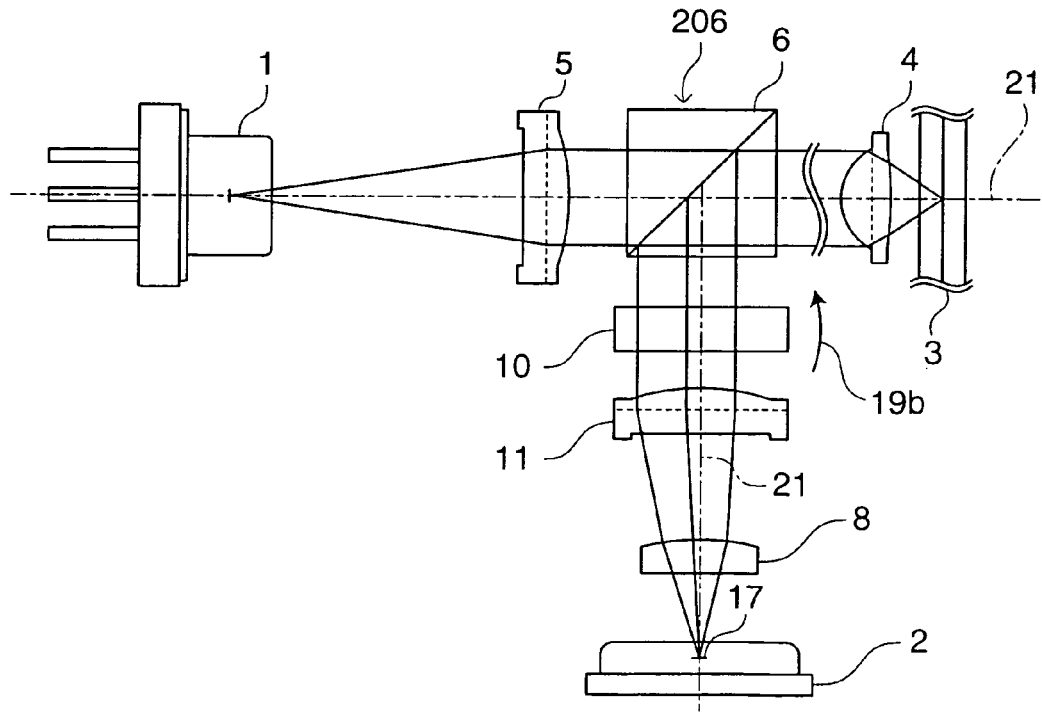
FIG. 13 is a diagram illustrating the construction of an optical disk apparatus according to a sixth embodiment of the present invention.

FIGS. 13 and 15 illustrate a sixth embodiment of the present invention. In these figures, there are shown an optical disk apparatus 206 including a light pickup device, a light source 1, a light detector 2, an optical disk 3, an objective lens 4, a collimator lens 5, a half mirror 6, a cylindrical convex lens 8, a balancing adjustment transparent plate 10, a spot lens 11, and an optical axis 21. The light detector 2 includes a light receiving member 17 provided therein. The balancing adjustment transparent plate 10 is disposed in a path of parallel light in a light detection optical system, and is adapted to be tilted with respect to the optical axis 21.

Light emitted from the light source 1 passes through the collimator lens 5 and the half mirror 6, and is condensed on the optical disk 3 by the objective lens 4. Light reflected from the optical disk 3 passes through the objective lens 4, and is reflected on the half mirror 6. Then, the reflected light passes through the adjustment transparent plate 10, the spot lens 11 and the cylindrical convex lens 8, and is projected on the light detector 2.

FIGS. 14(a) and 16(a) are enlarged diagrams illustrating the surroundings of the light receiving member 17 in the light detector 2 shown in FIGS. 13 and 15. FIGS. 14(b) and 16(b) are plan views of the light receiving member 17 shown in FIGS. 14(a) and 16(a). The light receiving member 17 includes a plurality of light receiving members (four light receiving segments 17a to 17d). Where a light beam directed toward the light detector 2 is offset due to displacement of the half mirror 6 to unbalance the amounts of the light projected on the respective light receiving segments 17a to 17d in the light detector 2 as shown in FIGS. 14(a) and 14(b), the adjustment transparent plate 10 is moved in the direction of an arrow 19b as shown in FIG. 13 for angular adjustment thereof. Thus, the unbalance of the amounts of the light projected on the respective light receiving members in the light detector 2 is corrected as shown in FIGS. 15, 16(a) and 16(b).

SEVENTH EMBODIMENT

Figure 19:
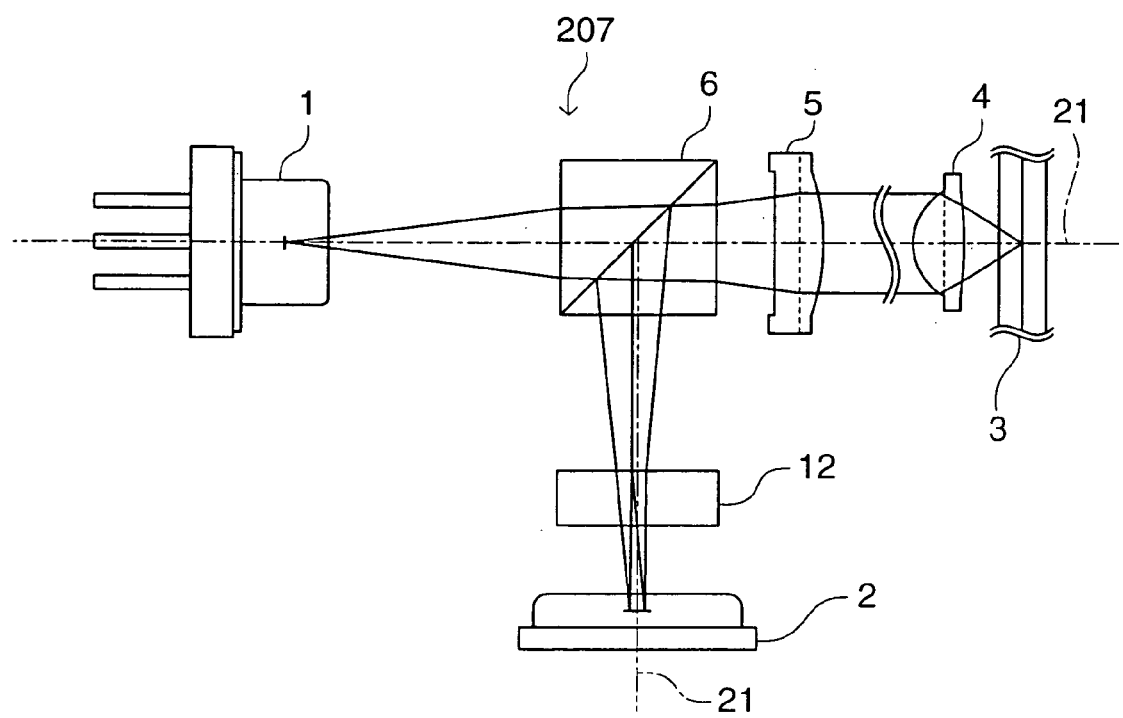
FIG. 19 is a diagram illustrating the optical disk apparatus of the seventh embodiment after adjustment.

FIGS. 17 and 19 illustrate a seventh embodiment of the present invention. In these figures, there are shown an optical disk apparatus 207 including a light pickup device, a light source 1, a light detector 2, an optical disk 3, an objective lens 4, a collimator lens 5, a half mirror 6, a hologram element 12, and an optical axis 21. The light detector 2 includes a light receiving member 17 provided therein.

Light emitted from the light source 1 passes through the half mirror 6 and the collimator lens 5, and is condensed on the optical disk 3 by the objective lens 4. Light reflected from the optical disk 3 passes through the objective lens 4 and the collimator lens 5, and is reflected on the half mirror 6. Then, the reflected light passes through the hologram element 12, and is projected on the light receiving member 17 in the light detector 2.

Figure 18:
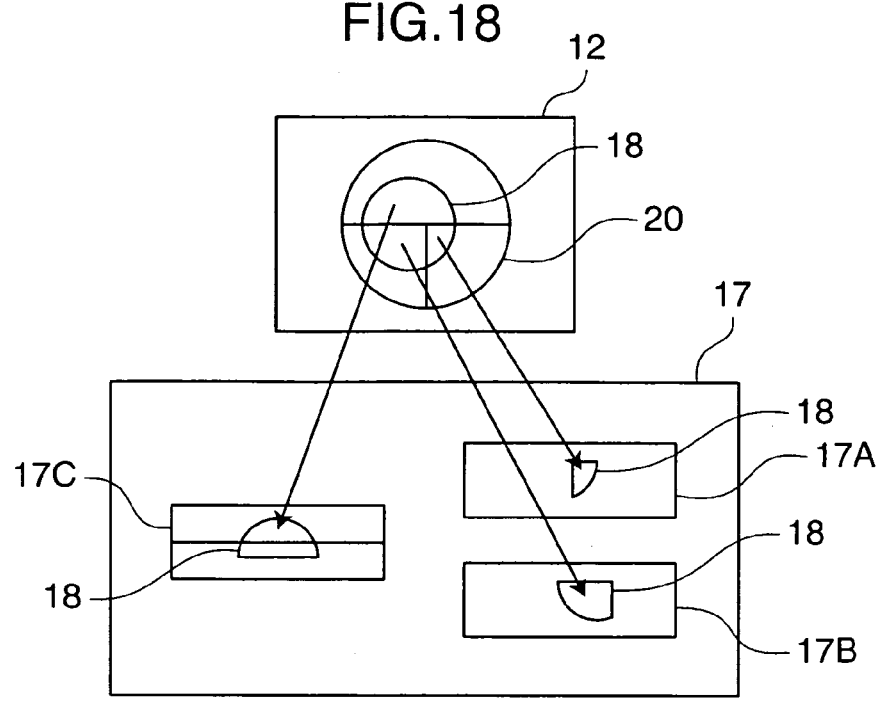
FIG. 18 is a diagram for explaining a relationship among a hologram element, light receiving members and a light spot illustrated in FIG. 17.
Figure 20:
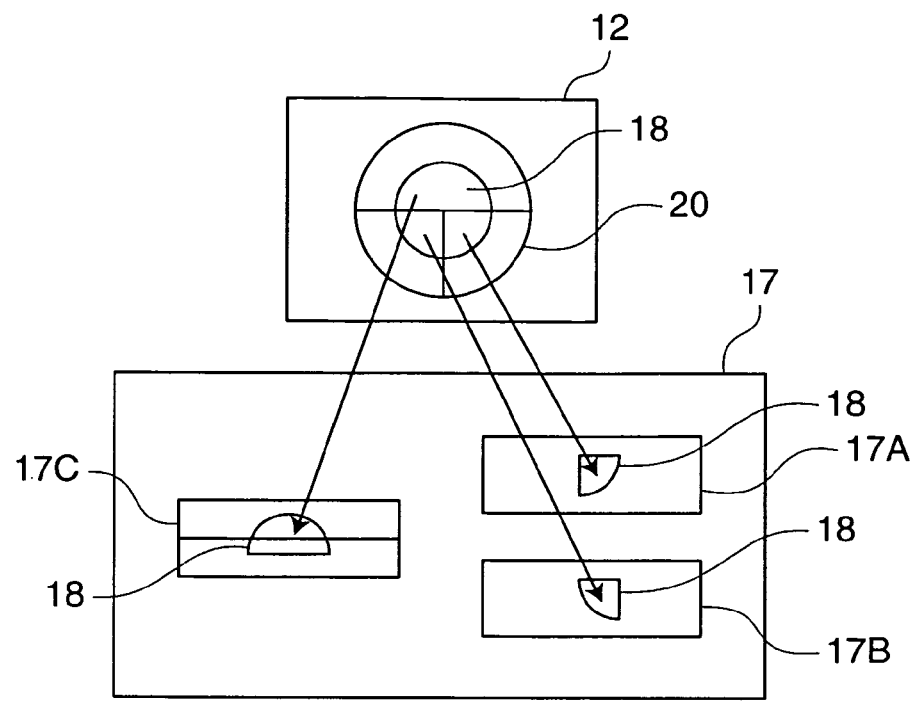
FIG. 20 is a diagram for explaining a relationship among the hologram element, the light receiving members and the light spot illustrated in FIG. 19.

A relationship among the hologram element 12, the light receiving member 17 in the light detector 2 and the light spot 18 illustrated in FIG. 17 is shown in FIG. 18. The hologram element 12 includes a hologram pattern 20, and the light receiving member 17 includes a plurality of light receiving members (three light receiving segments 17A to 17C). A relationship among the hologram element 12, the light receiving member 17 in the light detector 2 and the light spot 18 illustrated in FIG. 19 is shown in FIG. 20. Where a light beam directed toward the light detector is offset due to displacement of the half mirror 6 to unbalance the amounts of the light projected on the respective light receiving segments 17A to 17C in the light detector 2 as shown in FIGS. 17 and 18, the hologram element 12 is moved in the direction of an arrow 19 as shown in FIG. 17 for positional adjustment thereof. Thus, the unbalance of the amounts of the light projected on the respective light receiving members in the light detector 2 is corrected as shown in FIGS. 19 and 20.

EIGHTH EMBODIMENT

Figure 21:
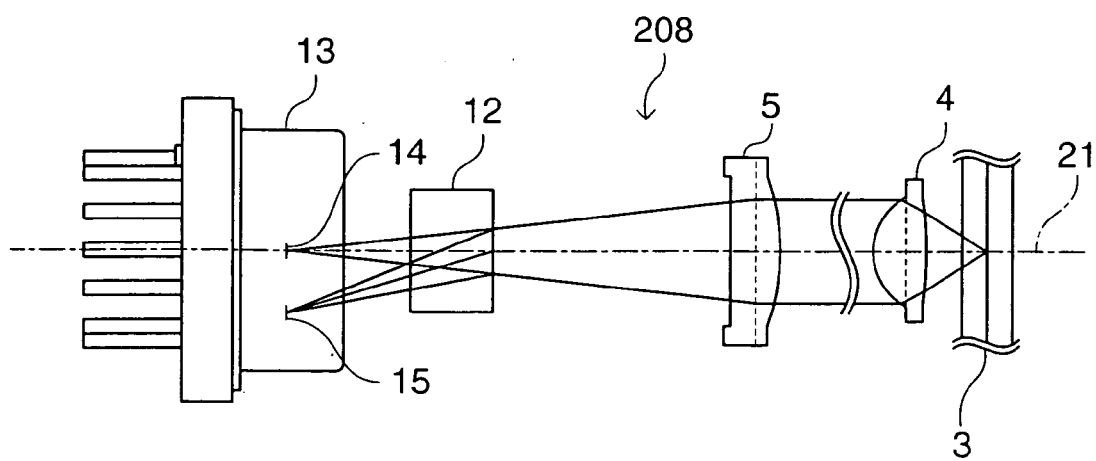
FIG. 21 is a diagram illustrating the construction of an optical disk apparatus according to an eighth embodiment of the present invention.

FIG. 21 illustrates an eighth embodiment of the present invention. In this figure, there are shown an optical disk apparatus 208 including a light pickup device, an optical disk 3, an objective lens 4, a collimator lens 5, a hologram element 12, a light source/light detector unit 13, a laser element 14, a light detection element 15, and an optical axis 21.

Light emitted from the laser element 14 passes through the hologram element 12 and the collimator lens 5, and is condensed on the optical disk 3 by the objective lens 4. Light reflected from the optical disk 3 passes through the objective lens 4 and the collimator lens 5, and then is projected on light receiving members in the light detection element 15 by the hologram element 12.

In this embodiment, the light source and the light detector are packaged into the single unit, so that the optical system is simplified. As in the seventh embodiment, the unbalance of the amounts of the light projected on the respective light receiving members in the light detection element 15 is corrected by adjusting the position of the hologram element 12.

NINTH EMBODIMENT

Figure 22:
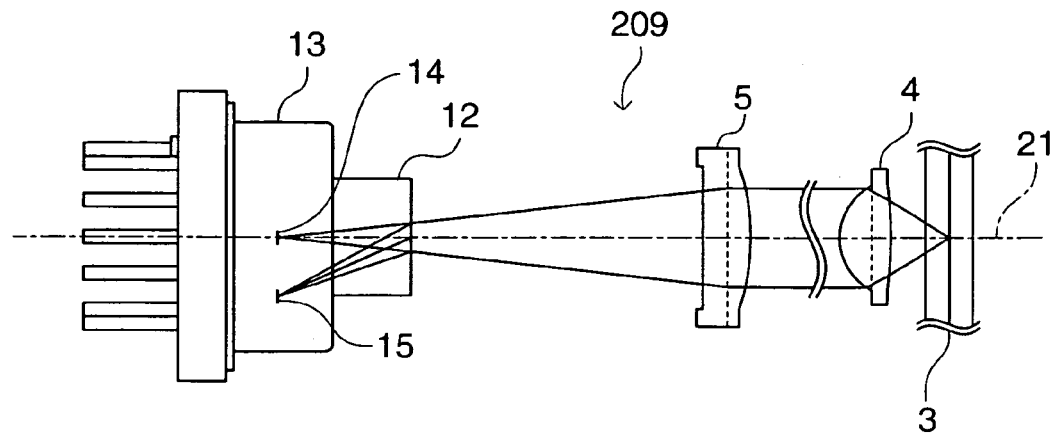
FIG. 22 is a diagram illustrating the construction of an optical disk apparatus according to a ninth embodiment of the present invention.
Figure 23:
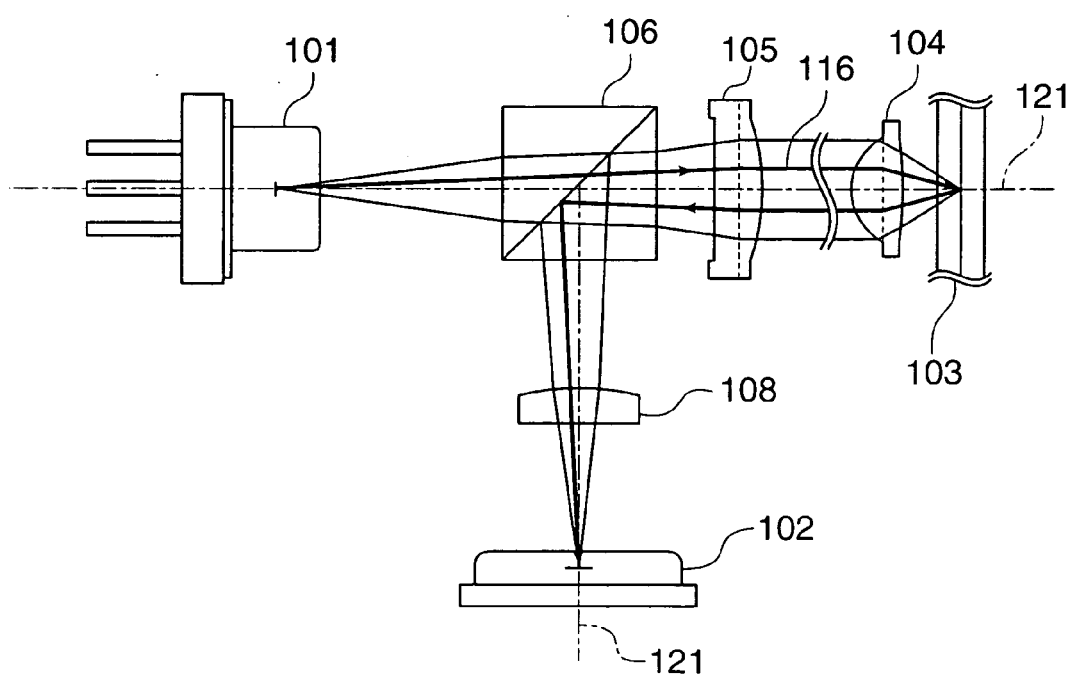
FIG. 23 is a diagram illustrating the construction of a conventional optical pickup device.

FIG. 22 illustrates a ninth embodiment of the present invention. In this figure, there are shown an optical disk apparatus 209 including a light pickup device, an optical disk 3, an objective lens 4, a collimator lens 5, a hologram element 12, a light source/light detector unit 13, a laser element 14, a light detection element 15, and an optical axis 21.

In this embodiment, the hologram element 12 is fixed on a package of the light source/light detector unit 13 after the hologram element 12 is adjusted in the eighth embodiment.

By thus fixing the hologram element 12 on the package of the light source/light detector unit 13, the unbalance of the amounts of light projected on light receiving members in the light detection element 15 is mitigated even if the light source/light detector unit 13 is displaced. Further, even if the package is distorted, the unbalance of the amounts of the light projected on the light receiving members in the light detection element 15 is mitigated, so that the reliability of the apparatus can advantageously be guaranteed for a long period of time.

TENTH EMBODIMENT

Figure 24:
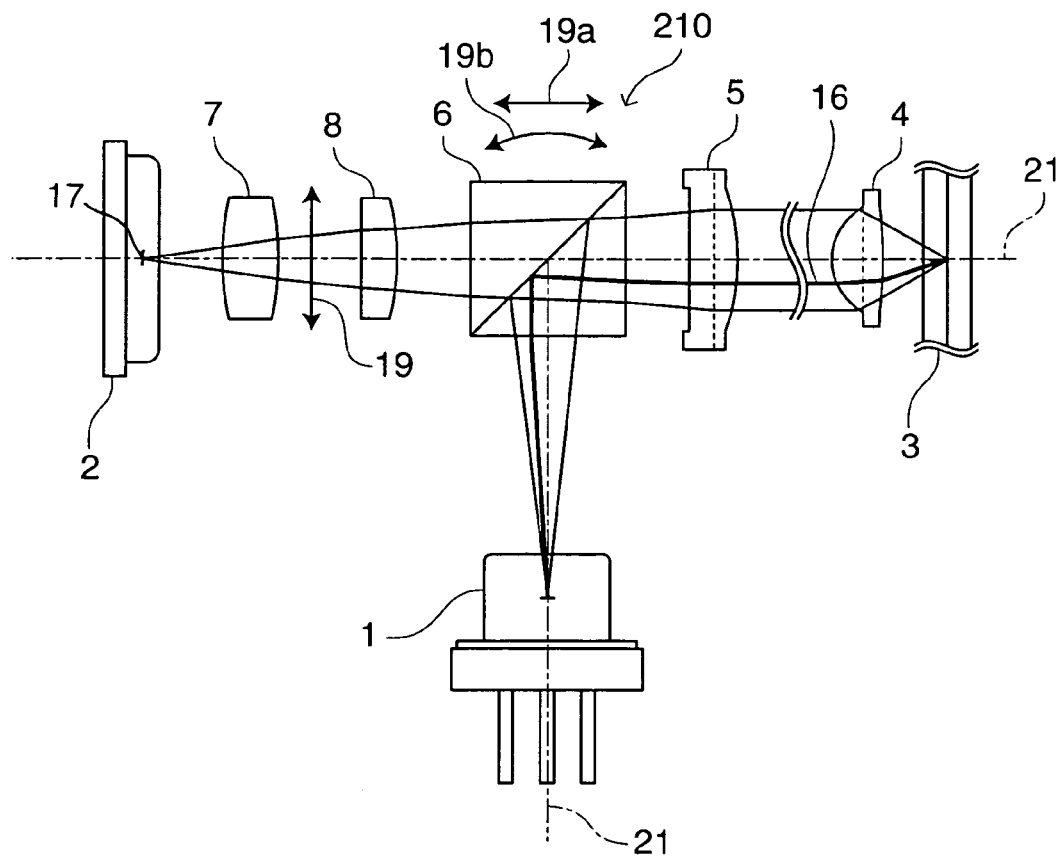
FIG. 24 is a diagram illustrating the construction of an optical disk apparatus according to a tenth embodiment of the present invention.

FIG. 24 is a diagram illustrating a tenth embodiment of the present invention. The tenth embodiment has substantially the same construction as the second embodiment (FIG. 3), except that a balancing adjustment convex lens 7 is additionally provided between the cylindrical convex lens 8 and the light detector 2.

Light emitted from the light source 1 is reflected on the half mirror 6, passes through the collimator lens 5, and is condensed on the optical disk 3 by the objective lens 4.

In this embodiment, the half mirror 6 (light reflective member) is employed as an optical element for adjustment of the center axis of a light intensity distribution. The half mirror 6 is disposed in a path of light projected from a light projection optical system, and is movable in the directions of arrows 19a, 19b in FIG. 24 for positional and angular adjustment thereof. Where the center axis 16 of the light intensity distribution of the light emitted from the light source 1 is offset from the optical axis 21 of the objective lens 4 as shown in FIG. 24, the position and angle of the half mirror 6 are adjusted. Thus, the center axis 16 of the light intensity distribution is adjusted so as to pass through the center (optical axis 21) of the objective lens.

On the other hand, light reflected from the optical disk 3 passes through the objective lens 4 and the collimator lens 5 and then through the half mirror 6, the cylindrical convex lens 8 and the adjustment convex lens 7, and is projected on the light detector 2.

The light receiving member 17 provided in the light detector 2 includes a plurality of light receiving members (four light receiving segments 17a to 17d) as shown in FIG. 8(*b*). Where a light spot 18 is offset due to displacement of the optical components to unbalance the amounts of the light projected on the respective light receiving segments 17a to 17d in the light detector 2, the adjustment convex lens 7 is moved in the direction of an arrow 19 (FIG. 24) for positional adjustment thereof. Thus, the unbalance of the amounts of the light projected on the respective light receiving members in the light detector 2 is corrected as shown in FIG. 9(*b*).

Figure 25:
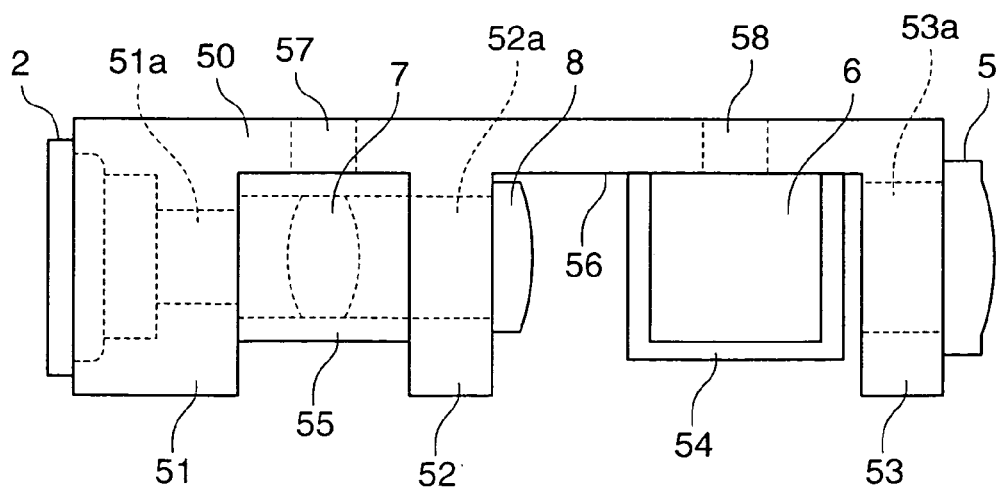
FIG. 25 is a top plan view illustrating a housing according of the tenth embodiment.
Figure 26:
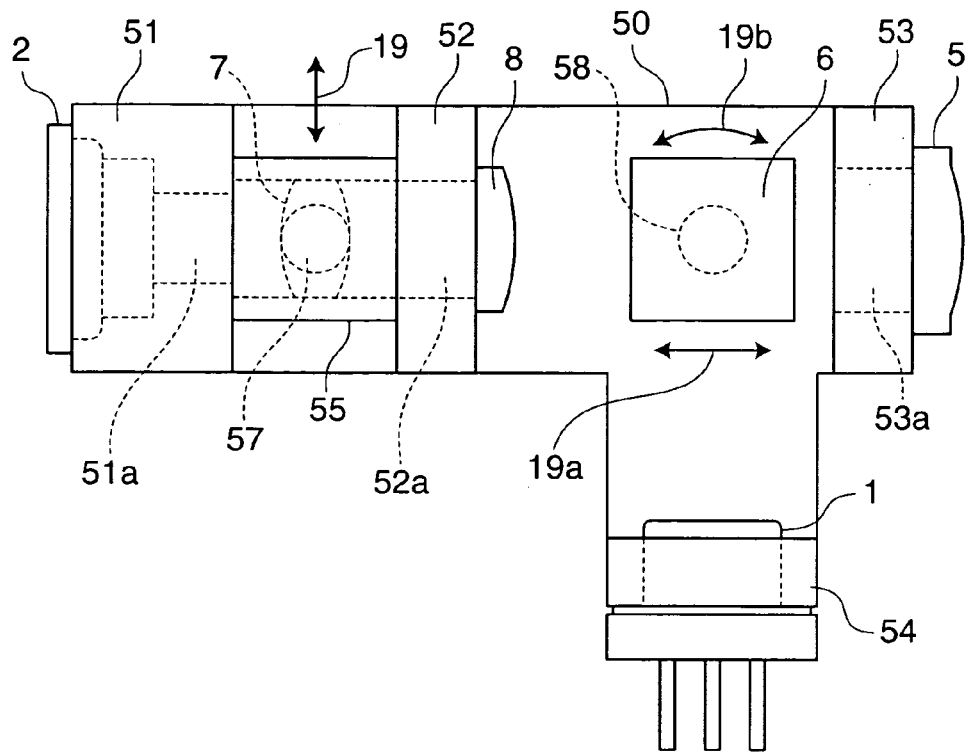
FIG. 26 is a side view illustrating the housing according of the tenth embodiment.

FIGS. 25 and 26 are a top plan view and a side view, respectively, illustrating a housing 50 according to this embodiment. As shown in these figures, the light detector 2, the cylindrical convex lens 8, the collimator lens 5 and the light source 1 are firmly held by holder members 51, 52, 53 and 54, respectively, in the housing 50.

The adjustment convex lens 7 is accommodated in a lens holder 55, which is inserted between the holder members 51 and 52. The housing 50 has adhesive injection holes 57, 58. The lens holder 55 is supported slidably in the direction of an arrow 19 (FIG. 26) in the housing 50 by a UV curable adhesive injected through the injection hole 57. The half mirror 6 is supported movably in the directions of arrows 19a, 19b (FIG. 26) on a flat surface 56 between the holder members 52 and 53 by a UV curable adhesive injected through the injection hole 58.

The holder members 51, 52 and 53 have light guiding through-holes 51a, 52a and 53a, respectively.

Figure 27:
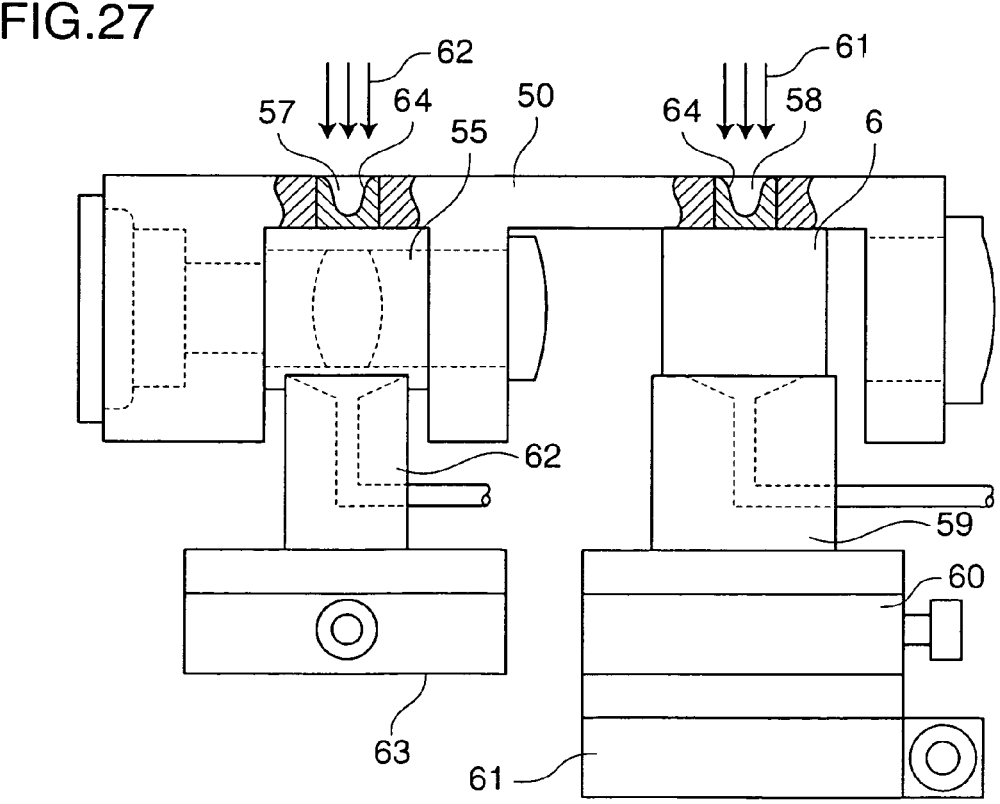
FIG. 27 is a diagram for explaining a positioning method according to the tenth embodiment.

FIG. 27 is a diagram for explaining how to position the half mirror 6 and the adjustment convex lens 7 with respect to the housing 50.

The half mirror 6 is positioned by means of a positioning device which includes a rotary stage 61, and a traverse stage 60 and a vacuum chuck 59 provided on the rotary stage 61.

More specifically, the half mirror 6 movably supported on the flat surface 56 of the housing 50 by the UV curable adhesive 64 injected in the injection hole 58 of the housing 50 is fixed by suction of the vacuum chuck 59, and then moved in the arrow directions 19a, 19b by actuating the stages 60, 61. After completion of the positioning of the half mirror 6, UV radiation 61 is applied to the inside of the injection hole 58, whereby the UV curable adhesive 64 is cured. Then, the vacuum chuck 59 is released.

On the other hand, the positioning of the adjustment convex lens 7 is achieved by means of a positioning device which includes a traverse stage 63 and a vacuum chuck 62 provided on the traverse stage 63. More specifically, the lens holder 55 supported slidably in the arrow direction 19 (FIG. 26) in the housing 50 by the UV curable adhesive 64 (FIG. 27) injected in the injection hole 57 is fixed by suction of the vacuum chuck 62, and then moved in the arrow direction 19 by actuating the stage 63. After completion of the positioning of the convex lens 7, UV radiation 62 is applied to the inside of the injection hole 57, whereby the UV curable adhesive 64 is cured. Then, the vacuum chuck 62 is released.

Thus, the half mirror 6 and the adjustment convex lens 7 are positioned with respect to the housing 50.

What is claimed is:

1. A light pickup device comprising:
    a light projection system comprising a light source which emits light, and an objective lens which condenses the light on an optical disk;
    a light detection system comprising a light detector, and a condenser lens which condenses light reflected from the optical disk on the light detector; and
    an adjustment element located on a path of the light between the light source and the objective lens for coinciding a center axis of an intensity distribution of the light condensed on the optical disk by the light projection system with an optical axis of the objective lens and which coincides the center axis by movement of the adjustment element relative to the objective lens,
    wherein the adjustment element comprises a planar light transmissive element whose movement is tilting relative to an axis of the light emitted from the light source.

2. A light pickup device as set forth in claim 1, wherein the light source and the light detector are unified.

3. A light pickup device comprising:
    a light projection system comprising a light source which emits light, and an objective lens which condenses the light on an optical disk;
    a light detection system having a light detector comprising a plurality of light receiving members, and adapted to condense light reflected from the optical disk on the light detector; and
    a balancing adjustment element located on a path of the light between the light detection system and the objective lens for balancing amounts of light incident on the respective light receiving members of the light detector and which balances the amounts of light by movement of the balancing adjustment element relative to the light detection system,
    wherein the balancing adjustment element comprises a planar light transmissive element whose movement is tilting relative to an axis of the light incident on the light detection system.

4. A light pickup device as set forth in claim 3, wherein the light source and the light detector are unified.

* * * * *

UNITED STATES PATENT AND TRADEMARK OFFICE
CERTIFICATE OF CORRECTION

| | |
|---|---|
| PATENT NO. | : 7,286,450 B2 |
| APPLICATION NO. | : 10/756228 |
| DATED | : October 23, 2007 |
| INVENTOR(S) | : Koji Miyake |

It is certified that error appears in the above-identified patent and that said Letters Patent is hereby corrected as shown below:

On the title page, under the section Prior Publication Data, please enter the section -- (30) Foreign Application Priority Data: January 22, 2003 (JP).......2003-013774 --.

Signed and Sealed this

First Day of April, 2008

JON W. DUDAS
*Director of the United States Patent and Trademark Office*